United States Patent
Leveque

(10) Patent No.: US 10,486,999 B2
(45) Date of Patent: Nov. 26, 2019

(54) METHOD FOR CAMBERING GLASS SHEETS

(71) Applicant: AGC GLASS EUROPE, Louvain-la-Neuve (BE)

(72) Inventor: Francois Leveque, Guemappe (FR)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/429,915

(22) PCT Filed: Sep. 2, 2013

(86) PCT No.: PCT/EP2013/068058
§ 371 (c)(1),
(2) Date: Mar. 20, 2015

(87) PCT Pub. No.: WO2014/044516
PCT Pub. Date: Mar. 27, 2014

(65) Prior Publication Data
US 2015/0246839 A1    Sep. 3, 2015

(30) Foreign Application Priority Data
Sep. 21, 2012    (BE) .................................. 2012/0627

(51) Int. Cl.
*C03B 23/03*    (2006.01)
*C03B 25/08*    (2006.01)
*C03B 23/025*    (2006.01)

(52) U.S. Cl.
CPC .......... *C03B 25/08* (2013.01); *C03B 23/0252* (2013.01); *C03B 23/03* (2013.01)

(58) Field of Classification Search
CPC . C03B 23/0307; C03B 23/0252; C03B 23/03; C03B 25/08
See application file for complete search history.

(56) References Cited

U.S. PATENT DOCUMENTS 2,766,555 A * 10/1956 Jendrisak ............ C03B 23/0258
65/103
3,332,761 A * 7/1967 Fredley ................. C03B 23/035
65/115

(Continued)

FOREIGN PATENT DOCUMENTS

DE   10 2008 017 729    10/2009
EP      0 440 113          8/1991

(Continued)

OTHER PUBLICATIONS

International Search Report dated Nov. 28, 2013 in PCT/EP13/068058 Filed Sep. 2, 2013.

*Primary Examiner* — Queenie S Dehghan
(74) *Attorney, Agent, or Firm* — Oblon, McClelland, Maier & Neustadt, L.L.P.

(57) ABSTRACT

The invention concerns a method for cambering glass sheets that are part of the composition of a laminate, comprising raising the temperature until the sheets soften, and shaping the sheets; in said method, after said shaping, the sheets are rapidly cooled to a temperature no greater than that of the glass-transition range, said cooling being carried out in an atmosphere having a controlled temperature in a forced convection treating the two faces of the sheets exposed to said atmosphere and providing a homogeneous temperature over the entire surface area of said sheets, apart from, possibly, the edges of said sheets if said edges are in contact with the support during said cooling.

17 Claims, 2 Drawing Sheets

(56) References Cited

U.S. PATENT DOCUMENTS

| | | | |
|---|---|---|---|
| 3,844,757 A * | 10/1974 | Kaufman | C03B 29/025 |
| | | | 65/114 |
| 4,743,285 A * | 5/1988 | McKelvey | C03B 35/14 |
| | | | 65/103 |
| 5,094,678 A | 3/1992 | Kramer et al. | |
| 5,209,767 A * | 5/1993 | Maltby, Jr. | C03B 25/093 |
| | | | 65/162 |
| 5,992,180 A * | 11/1999 | Tsuchiya | C03B 23/0252 |
| | | | 198/463.2 |
| 7,367,205 B1 | 5/2008 | Boaz | |
| 7,389,655 B2 * | 6/2008 | Yli-Vakkuri | C03B 23/0252 |
| | | | 65/287 |
| 2003/0233846 A1 | 12/2003 | Boaz | |
| 2010/0251773 A1 | 10/2010 | Vehmas | |
| 2012/0171632 A1 | 7/2012 | Novak et al. | |

FOREIGN PATENT DOCUMENTS

| | | |
|---|---|---|
| FR | 1 598 242 | 7/1970 |
| WO | 91 11398 | 8/1991 |
| WO | 2009 060120 | 5/2009 |
| WO | 2011 018226 | 2/2011 |

\* cited by examiner

METHOD FOR CAMBERING GLASS SHEETS

The invention relates to the bending of motor vehicle glazing units.

The glazing units intended for motor vehicles must satisfy many requirements. The optical and mechanical characteristics thereof in particular must meet rigorous standards. The many techniques developed for bending the glass sheets that form them endeavor to meet these requirements while keeping the production costs as low as possible.

Two main methods for bending motor vehicle glazing units are commonly used. The first is referred to as gravity bending. The flat glass sheet or sheets are brought to the softening point of the glass. Under their own weight, the sheets come to rest on a support. The support is either a frame which holds the sheets at their periphery, or conveyor rollers that gradually have a more curved profile. The second bending method, which is often combined with the first, imposes a local or overall pressure on the sheets in order to make them take on the shape of the press.

In these techniques, the use of a frame that supports the sheets at their periphery, when the bending operation only comprises action by gravity, makes it possible to retain a surface that is free of optical defects. Apart from the periphery, the glass sheets are not in contact with any part capable of marking the softened glass. The central regions, which are also the viewing regions, therefore have a very high optical quality. The trade-off is the less rigorous control of the shape away from the periphery.

The advantage of contact with the pressing mold is to achieve a better conformity of the sheet with the fixed model in the central portion of the glazing unit. On the other hand, the contact of the sheet with the surface of the mold may impair the optical quality of the glazing unit.

All sorts of improvements have been proposed in order to attempt to combine the advantages of these two methods.

The developments in manufacturers' needs and requirements such as that of lightening the glazing units, like all motor vehicle components, call into question previous choices.

In all cases, apart from considerations strictly targeting the qualities of the products obtained, economic imperatives also impose compromise choices. The production of side glazing units, that of the rear window or of glazed roofs is, in general, less restrictive as regards the optical quality. On the other hand, the production cost must be minimized as much as possible, and the rates of production, determining factors for the cost, take on particular importance.

The specific requirements of laminated glazing units, and in particular of windshields, as regards the quality, cannot lead to the economic aspects being neglected. The latter are particularly the rates of production and also the saving of investments. These considerations lead, for example, to pursuing the possibilities of using equipment for all the productions, the less demanding in terms of optical quality of the glazing units but most demanding in terms of cost, and those which conversely give priority to the optical quality.

The objective of the invention is to meet these various requirements. In particular the objective of the invention is to propose means that retain the essential qualities of the products, optical qualities and mechanical qualities, while increasing the rates of production, in other words while reducing the cycle time.

From the storage of flat precut sheets up to the receipt of curved and cooled sheets, each stage of the shaping process is involved in determining the cycle time. In pursuit of reducing the cycle time, the main earlier efforts have focused on the stages which relate to the shaping. On the other hand, subsequent treatments have not been considered much. Nevertheless, they are determining stages for certain properties, in particular mechanical properties.

Regarding tempered products, the cooling is necessarily rapid. It is as a function of this rapidity that the stresses are developed in the glass by the formation of a temperature gradient between the surface and the inside of the sheet. For products such as laminated windshields, the presence of surface stresses in the central portion of the glazing unit must be avoided. The presence of these stresses makes the windshield very fragile with respect to impacts such as those of gravel. Although slowing down the cooling appears necessary for avoiding the formation of stresses, the rigorous maintaining of the shape obtained also requires that the time which separates the shaping from the time when the sheet reaches the glass transition temperature range be sufficiently short, in order to avoid a possible deformation subsequent to the bending.

In order to attempt to improve the technique for shaping "non-tempered" products, without sacrificing the economic requirement of as short as possible a treatment time, the inventors propose the process that is the subject of claim 1. The term "non-tempered" should be understood to mean products such as the glass sheets that are part of the composition of laminated windshields, products which, as regards their mechanical properties, must have a high strength, in particular with respect to the impact of gravel.

The process according to the invention aims to retain a high rate of cooling of the glass sheets until they can no longer be deformed. In this cooling time, in order to avoid the formation of surface stresses as much as possible, the temperature is kept substantially uniform over the entire surface of the sheets. In order to achieve this result, the sheets are subjected to a cooling by means of a high gas flow, at controlled temperature. The circulation of this flow brings it in contact with the two exposed faces of the sheets. Increasing the velocity of the convection atmosphere over the faces establishes a good equilibrium of the heat exchanges avoiding the temperature differences that generate stresses that it is endeavored to minimize.

The temperature of the atmosphere in contact with the sheets determines the intensity of the exchanges. Depending on the equipment in which the cooling is performed, the operation takes place in a continuous or stepwise manner. In a continuous manner, the sheets pass into a single chamber and the temperature of the atmosphere therein is adjusted essentially so that the temperature at the outlet is below the glass transition temperature. In contact with the glass, the atmosphere is inevitably heated, which may result in an initial ambient temperature higher than that which exists, still in the atmosphere, toward the outlet of the chamber. In all cases, the setpoint temperatures take into account these glass/atmosphere exchanges. In equipment that operates in a stepwise manner, the sections that follow one another may have different temperature conditions. The temperature of the final cooling stage remains, in all cases, below the glass transition temperature. But for the preceding stages, the choice of the setpoint temperature for the atmosphere preferably decreases in steps corresponding to each of these stages. In this case, each temperature is chosen so as to guarantee the desired rate of decrease.

The final temperature in both the continuous and stepwise methods preferably lies between 360° C. and 480° C. and advantageously between 400° C. and 460° C. By way of indication, the glass transition temperature for the most common soda-lime-silica glasses is of the order of 550° C.

The choice of using, for the convection, a temperature which is not too far from the temperature of the glass transition range, although this temperature does not favor a very rapid cooling rate, guarantees the possibility of maintaining a good homogeneity. The intensity of the convection is kept sufficient to retain the desired cooling rate.

The cooling is carried out in a chamber in which the gas flows advantageously circulate in a loop. This circulation is provided by means of powerful fans or turbines. These means ensure a rapid renewal of the contact of the atmosphere with the glass sheets. This renewal ensures the equalization of the temperature of the sheets. The volume of the atmosphere circulating in contact with the sheets is relatively large and the heating thereof cannot usually result from only the heat input of the sheets themselves. Heating means in contact with the gas flow ensure the temperature is maintained.

The circulation of the cooling atmosphere is such that, away from the immediate edges of the sheets, the temperature differences do not exceed 20° C., and preferably do not exceed 10° C.

In order to achieve these objectives, the circulation of the atmosphere is necessarily intense. The renewal thereof in contact with the sheets must be as rapid as possible. The atmosphere of the chamber is preferably circulated in such a way that a volume at least equal to that of the chamber is moved around every 8 seconds. Advantageously, this movement is obtained in 5 seconds or less.

According to the invention, the conditions of the convection atmosphere, circulating volume, circulation rate close to the faces of the sheet, and maintained temperature of this atmosphere are adjusted so that the temperature of the sheet decreases by at least 1° C. per second and preferably by at least 1.5° C. per second. Under these conditions, the cooling time down to a temperature below and in the vicinity of the glass transition is advantageously at most around 120 s and preferably at most 90 s. It is preferably as short as maintaining a very uniform temperature over the entire area of the sheet, with the exception of the edges in contact with the support for the sheet, allows.

Irrespective of the measures taken to avoid the formation of surface stresses on the central portions of the sheets, as indicated above, if the level of these stresses is such that the glazing unit remains too sensitive to impacts, the invention also proposes to ensure that the appearance of these stresses is followed by a stage that makes it possible to minimize them, or even practically to eliminate them.

In this particular method, as above, the sheet is, in a first step, cooled to a temperature substantially below the glass transition temperature in order to set its shape. Considering the fact that measures follow that aim to eliminate the optional surface stresses, the cooling may be even more intense, for example using the atmosphere at a lower temperature, and subsequently may result in a faster cooling. For eliminating central surface stresses, this cooling is, in a second step, followed by a heating of the sheet at a temperature and for a time that result in the relaxation of the surface stresses in question. The sheet is then, in a third step, brought to a lower temperature as above.

The temperature for the relaxation of the stresses is preferably no more than 20° C. and preferably no more than 10° C. above the temperature of the glass transition range. This range is not the type to be defined specifically, acting, as its name indicates, as a "range" of transition between two states. The transition takes place gradually and may extend over twenty or so degrees. The values indicated for the relaxation temperatures are understood to be values determined from the median values of these ranges. The treatment involves the temperature but also the time during which this temperature is maintained so that this treatment does not only affect the surface. The higher the temperature, the shorter the time. A temperature that is as low as possible is preferred in order not to recreate, during the subsequent cooling, the stresses that it is endeavored to eliminate. A compromise is necessary so that the treatment time is not too long either. In practice, the conditions are adjusted so that the temperature hold is no longer than 30 seconds and preferably no longer than 20 seconds.

The invention is described in detail below, with reference to the figures in which.

Figure 1A:
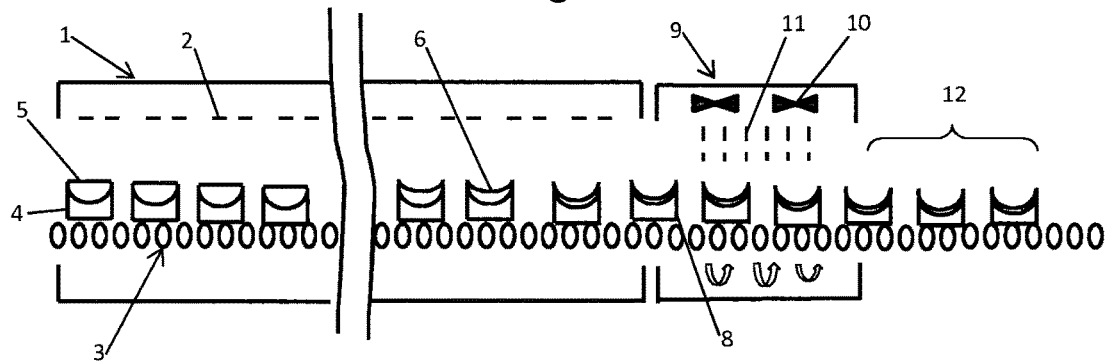
FIGS. 1a, 1b and 1c are schematic views illustrating various embodiments of bending equipment according to the invention.

The equipment shown schematically in FIG. 1a comprises a furnace 1. The furnace is heated by a set of electric resistance heaters 2. A conveyor 3 transports frames 4 which support the glass sheets 5 during their progression in the furnace. The frame carries one or two glass sheets. In second case, superposed sheets are bent simultaneously. The two sheets are intended to be assembled subsequently into a laminated glazing unit.

At their entry into the furnace, the glass sheets 5 are flat. While progressing, they are heated until they soften. As represented by 6, the softened sheets bend into a curve under their own weight until they take on the profile of the frame that supports them.

In the prior art, the frames carrying the sheets, still on the conveyor, then pass into the cooling zone, usually a simple tunnel without heating or substantial thermal insulation, the sole purpose of the walls of which is to avoid exposing the glass to overly random cooling conditions. After sufficient cooling, the frames and the glass sheets, while continuing their progression, are cooled in the open air to a temperature close to ambient temperature. The end of the cooling operation may take place in the storage area. The frames are then returned to the entry of the furnace for a new treatment.

In the method illustrated in FIG. 1a, schematically showing one embodiment according to the invention, after the bending has been achieved, the cooling is carried out in the chamber 9. In this chamber, an intense circulation of the thermal conditioning atmosphere ensures the fastest possible cooling without leading to the formation of undesirable surface stresses.

In this chamber, the sheets are subjected to a forced convection using fans 10. The convection gas streams are maintained at adequate temperatures by circulating the convection gases over heating means, for example electric resistance heaters 11.

The convection gas streams are associated with ducts made in the walls, which direct them so that the whole of the sheets, with the possible exception of their edges, is treated as uniformly as possible.

After the temperature of the sheets has fallen below the glass transition range, the cooling is completed at ambient temperature in 12.

In the process from FIG. 1a, the glass sheets are positioned on one and the same frame throughout their progression.

Figure 1B:
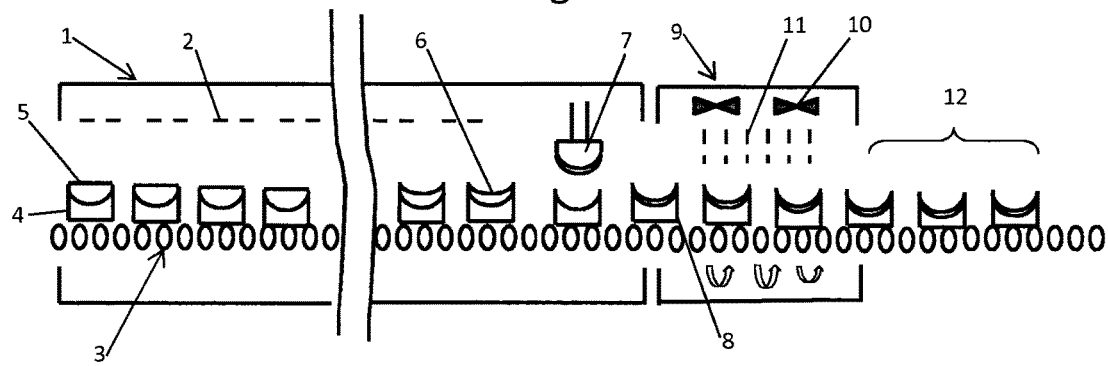

FIG. 1*b* presents a variant of 1*a*. As above, in a first step, the glass sheets are subjected to a gravity bending operation. This bending operation is not complete. The sheets are taken up by a pressing technique. In the diagram from FIG. 1*b*, the sheets are for example carried on a male form 7 under conventional conditions.

The pressing operation is for example carried out by a movement that brings the frame 4 and the press 7 together. Complementary suction means may also supplement the contacting of the glass sheet with the surface of the press 7.

The pressing operation is presented as carried out in the very chamber of the furnace 1. Various alternatives are also possible that carry out the pressing operation outside the furnace. This solution facilitates the implementation of the pressing means. The temperature conditions in the pressing stage differ slightly in order to take into account this lack of heat input at this stage.

The next stage regarding the cooling of the glass is carried out as for the process illustrated in 1*a*.

Figure 1C:
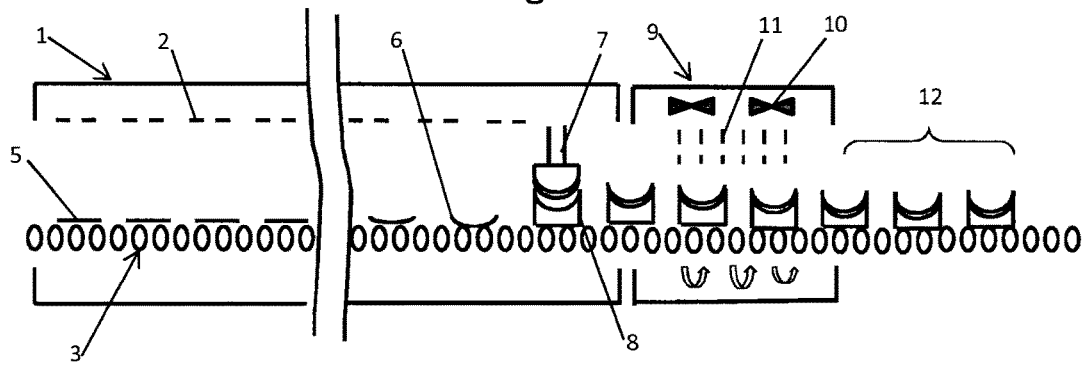

FIG. 1*c* schematically illustrates another embodiment in which the glass sheets are systematically treated individually. In the embodiment in question, the conveyor carries the softened sheets that are preformed by an appropriate arrangement of the curved rollers to underneath a press 7. The glass sheet is applied against the press, for example using a frame which raises it from the conveyor. Various means are known for placing the sheet on the frame, including for example a suction gripping system.

After shaping on the male press 7, the sheets are laid on a frame for cooling. Ordinarily, this frame is different from the one that carries the sheets to the press 7. The remainder of the treatment is analogous to that described above for the figures shown schematically in 1*a* and 1*b*.

After the bending operation, the glass sheet is preferably placed on a support 8. The support consists of a frame that supports the sheet at its perimeter. Other embodiments are also possible in which the sheet is for example deposited directly on a conveyor having a profile that may or may not be adapted to the curved shape of the sheet. The advantage of using the frame compared to the other possibilities is that it limits the contact of the glass to only the periphery of the sheet. By this means, any additional impairment of the quality of the viewing regions is avoided. The only marks, if there are any, are found in a portion of the sheet in which these marks do not cause any inconvenience.

The glass sheets brought back, under the conditions indicated above, to the glass transition temperature may then continue their cooling down to ambient temperature outside the chamber in the stage referenced 12. Although the various stages preceding the final cooling must be carried out as rapidly as possible, the quality of the glazing units obtained is not linked to the duration of the last stage. The sheets may therefore cool with no particular arrangement, simply in contact with the ambient atmosphere.

The variants presented do not exhaust the prior art shaping possibilities. The sheets, previously bent, irrespective of the variant chosen, may give rise to the implementation of the invention.

Figure 2:
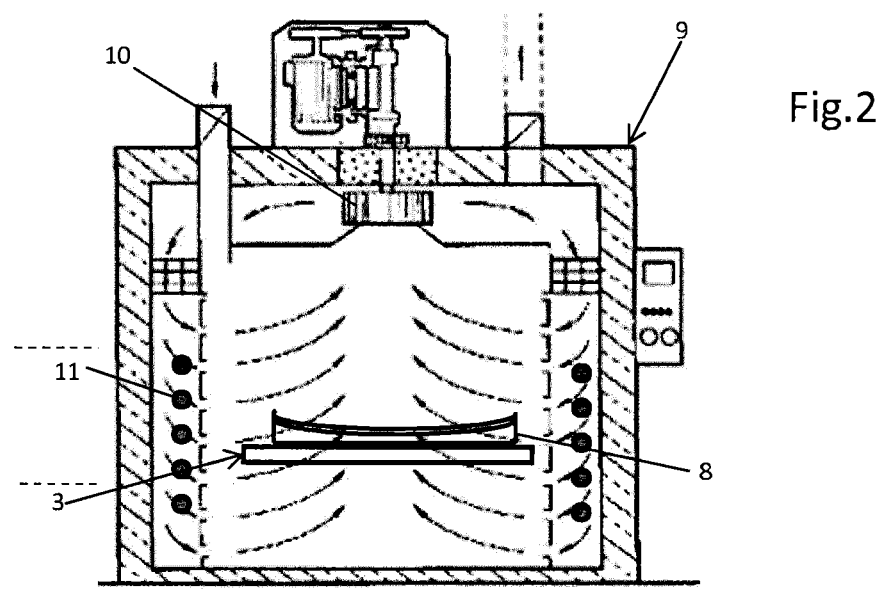
FIG. 2 is a cross-sectional view of a cooling chamber according to the invention.

FIG. 2 presents, in cross section, one embodiment of the chamber 9 for the implementation of the invention. In this configuration, the circulation of the gases is carried out so that these gases are recycled in order to limit the energy consumption. The suction by the fans 10 sends the gas into the double side walls of the chamber. The means for heating the gas flow 11 are positioned in these double walls. The representation places these means in the vertical walls. It goes without saying that the heating means may be located differently and in particular completely or partly in the upper wall of the chamber.

In order to ensure the best possible heat exchange between the convection flows in the chamber and the glass sheets, a large portion of the gases is sent underneath the conveyor 3 carrying the frames 8.

In one implementation example, without this example being limiting in nature, tests are carried out on glass sheets that are part of the composition of a windshield. The glass sheets are sheets of clear soda-lime glass. The thickness of each of these sheets is 2.1 mm.

In a first test, the two sheets that are subsequently assembled are produced individually as indicated in connection with FIG. 1*b*.

The press is positioned at the outlet of the chamber of the furnace. On leaving the press, the sheet is placed on a frame in order to carry out the cooling. The temperature of the sheet on leaving the press is not uniform. The differences may reach 30° C. between the edge temperature and the temperature at the center of the sheet. The objective is to achieve as low as possible a difference while cooling the sheet, in the minimum amount of time.

Various configurations are tested. The conditions are, for a chamber having a volume of 3 m$^3$, an air circulation of 1000 m$^3$/h. The saving obtained is also a function of the temperature of the convection gas. In the tests, three gas temperatures are tested: 575° C., 520° C. and 450° C. The time saving for achieving the temperature difference that does not exceed 10° C. is even more significant when the intensity of the convection is greater and when the temperature of the convection gas is higher. Under the best conditions, when an intense convection is imposed in the cooling chamber, the time for cooling and equalizing the temperature of the sheet is reduced by 30%.

A second series of tests is carried out in which, still in the arrangement comprising gravity bending followed by a pressing operation, the invention is applied to glass sheets treated in pairs that are intended to be part of the composition of a windshield. The sheets are respectively 2.1 mm and 1.6 mm thick, the outer sheet being the thickest.

The edge stresses induced in the process are measured with respect to the same physical quantities without using convection. The temperatures in the convection zone are set at 300° C., 360° C. and 450° C. The cooling of the glass sheets is rapid.

The gain in compressive stress at the edges with convection is even greater when the temperature of the atmosphere is lower. This is induced by the more intense cooling. With an atmosphere at 300° C., the compression is established on average at 25 MPa. Without convection, the average value obtained is only 19 MPa. The result is also significant if not the average value but the lowest value, which determines the highest brittleness, is considered. In practice, without convection a value which is of the order of 12 MPa is measured, and with convection the lowest value is no lower than 16 MPa.

If the edge compressive stress is high, it is even more advisable to minimize the tensile stress which immediately follows it when moving away from the edge. The minimum is obtained with convection at 450° C., is thus established on average at 2.1 MPa and does not exceed 3.4 MPa, whereas without convection the stress exceeds 3.1 MPa and at most is of the order of 43 MPa.

The measurement of the surface tensile stresses also shows the advantage of proceeding using convection, especially when the temperature of the atmosphere is lower. At 300° C. the highest measurement with convection does not exceed 0.4 MPa. Without convection this value is greater than 2.6 MPa.

The above results show, on the one hand, that the convection enables a saving of treatment time without impairing the mechanical properties of the sheets. They also show that the choice of the treatment temperature is important in the characteristics of the induced stresses. A compromise choice as regards the treatment temperature according to the invention is possible. This is the reason why, according to the invention, it is preferred to fix this temperature between 420° C. and 480° C.

The gain in strength is also estimated by carrying out a gravel impact test. The test used comprises dropping a dart on the glazing unit. The weight, the nature of the tip and the drop height are chosen in order to artificially reproduce the conditions encountered in practice. The gain in strength for glazing units treated according to the invention in comparison with identical glazing units for which no convection is applied, is of the order of 15% and even better when the convection temperature is higher.

As indicated above, the brittleness is linked to the formation of surface stresses during a cooling operation in which the edges of the sheet and its central portion are not at a sufficiently uniform temperature. The presence in particular of a tensile stress value is a definite cause of brittleness.

If the chosen cooling operation is very rapid, even by using convection to minimize the undesirable stresses, it is not possible to reduce these stresses to levels that guarantee an adequate strength.

In order to eliminate the induced stresses which may also result partly from the overly rapid cooling optionally imposed during this convection operation, the inventors propose, if necessary, to carry out a stress relaxation stage before the final cooling operation.

Figure 3:
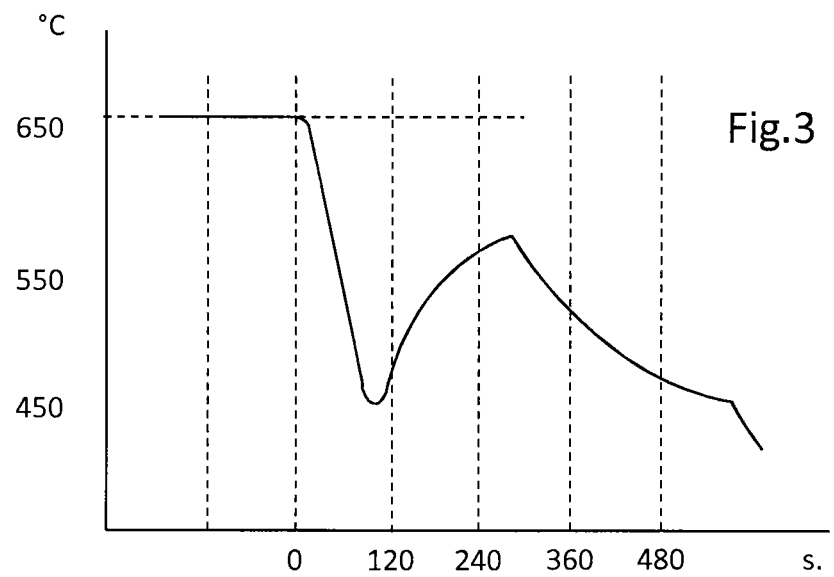
FIG. 3 represents a temperature curve of sheets subjected to a stress relaxation.

FIG. 3 shows an example of a temperature curve associated with the series of operations in question. The temperature on leaving the bending furnace is established at around 640° C. The intense convection carried out with an atmosphere having a temperature that is maintained at 400° C. brings the temperature of the sheet back to 450° C. in around 90 seconds, namely a decrease of the order of slightly more than 2° C./s. This rapid temperature decrease leads to the formation of stresses, including undesirable surface stresses.

In order to return to stress conditions that are compatible with the uses in question, the process is completed by a heating of the shaped sheet to a temperature and for a time which makes it possible to relax the stresses without however the shape being impaired. The heating is carried out for example in a first chamber similar to that used previously for equalizing the temperature during the cooling. The heating is the opportunity to obtain a very uniform temperature and, for this purpose, is carried out with intense convection. In order to shorten the temperature increase time of the sheet, the atmosphere is brought to around 650° C.

The temperature for relaxation of the stresses lies at around 550° C. It is reached after around 90 seconds. The temperature is maintained above 550° C. for about 20 seconds.

The subsequent treatment comprises once again the decreasing of the temperature of the sheet as above. This decrease takes place starting from a temperature substantially lower than at the outlet of the shaping operation. For this reason the stresses produced, if the other conditions are maintained, are substantially lower. This is a substantial advantage as regards the surface tensile stresses that control the strength, in particular the gravel impact strength.

The invention claimed is:

1. A process for bending glass sheets, wherein the glass sheets are part of a laminate composition and each sheet has two faces, the process comprising:
    conveying the glass sheets through a furnace;
    raising the temperature of the sheets until the sheets soften;
    shaping the sheets; and
    after the shaping, conveying the glass sheets into a cooling chamber and cooling the sheets at a rate of no less than 1° C./s to a temperature at most equal to that of a glass transition range thereof,
    wherein the cooling is carried out in a controlled temperature atmosphere in the chamber by maintaining a temperature of the controlled temperature atmosphere between 360° C. and 480° C. with forced convection treating the two faces of the sheets exposed to the atmosphere while ensuring a uniform temperature over an entire area of the sheets, not including edges of the sheets if the sheets are in contact with a support during the cooling.

2. The process as claimed in claim 1, wherein temperature differences across the sheets, not including the edges of the sheets, are maintained during the cooling at less than 20° C.

3. The process as claimed in claim 1, wherein a temperature of the convection atmosphere, at least at an end of cooling, is maintained below the glass transition temperature.

4. The process as claimed in claim 3, wherein the cooling comprises decreasing the temperature of the atmosphere in a stepwise progression.

5. The process as claimed in claim 1, wherein the cooling of the sheets takes the sheets to a temperature below the temperature of the glass transition range.

6. The process as claimed in claim 1, wherein the cooling of the sheets takes the sheets to a temperature below the glass transition temperature, the sheets then being heated to close to the glass transition temperature range for a relaxation of stresses introduced during cooling, the heating being followed by a new cooling operation.

7. The process as claimed in claim 6, wherein the heating of the sheets brings the sheets to a temperature no more than 20° above that of the glass transition range.

8. The process as claimed in claim 1, wherein the cooling is carried out at a rate of no less than 1.5° C./s.

9. The process as claimed in claim 1, wherein the cooling is carried out in no more than 90 seconds.

10. The process as claimed in claim 1, wherein the cooling is carried out in no more than 120 seconds.

11. The process as claimed in claim 1, wherein a temperature of the controlled temperature atmosphere is maintained between 420° C. and 480° C.

12. The process as claimed in claim 1, wherein during the cooling of the glass in the chamber the atmosphere in the chamber is circulated such that a volume of atmosphere at least equal to a volume of the chamber is moved in no more than 8 seconds.

13. The process as claimed in claim 1, wherein a temperature at an outlet of the cooling chamber during cooling is below the glass transition temperature.

14. A process for bending glass sheets, wherein the glass sheets are part of a laminate composition, the process comprising:
    conveying the glass sheets through a furnace;
    raising a temperature of the sheets until the sheets soften;

shaping the sheets; and after the shaping, conveying the glass sheets into a cooling chamber and cooling the sheets to a temperature at most equal to that of a glass transition range of the glass sheets, wherein a temperature of the atmosphere in the cooling chamber is maintained between 360° C. and 480° C. during cooling and the cooling is carried out in the chamber with forced convection treating two faces of the sheets exposed to the atmosphere.

15. The process as claimed in claim 14, further comprising ensuring a uniform temperature over an entire area of the sheets, not including edges of the sheets if the sheets are in contact with a support during the cooling.

16. The process as claimed in claim 14, wherein the cooling is carried out at a rate of no less than 1° C./s.

17. The process as claimed in claim 14, wherein the cooling is carried out in no more than 90 seconds.

\* \* \* \* \*